United States Patent
van den Elzen et al.

(10) Patent No.: US 9,171,387 B2
(45) Date of Patent: Oct. 27, 2015

(54) DATA VISUALIZATION SYSTEM

(75) Inventors: Stefano Johannes van den Elzen, S-Hertogenbosch (NL); Jarke Jack van Wijk, Eindhoven (NL); Danny Hubertus Rosalia Holten, S-Hertogenbosch (NL); Jorik Blaas, S-Hertogenbosch (NL)

(73) Assignee: SYNERSCOPE BV, S—Hertogenbosch (NL)

(*) Notice: Subject to any disclaimer, the term of this patent is extended or adjusted under 35 U.S.C. 154(b) by 406 days.

(21) Appl. No.: 13/593,853

(22) Filed: Aug. 24, 2012

(65) Prior Publication Data
US 2014/0059456 A1 Feb. 27, 2014

(51) Int. Cl.
G06F 3/048 (2013.01)
G06T 11/20 (2006.01)

(52) U.S. Cl.
CPC .................... *G06T 11/206* (2013.01)

(58) Field of Classification Search
CPC ...... G06F 3/0481; G06F 3/0482; G06F 15/00
USPC .......... 715/200, 205, 215, 738, 764; 709/226; 345/440
See application file for complete search history.

(56) References Cited

U.S. PATENT DOCUMENTS

| | | | |
|---|---|---|---|
| 2002/0136437 A1* | 9/2002 | Gerard et al. | 382/128 |
| 2007/0061043 A1* | 3/2007 | Ermakov et al. | 700/263 |
| 2011/0307322 A1* | 12/2011 | Hsiao et al. | 705/14.41 |
| 2012/0280999 A1* | 11/2012 | Nachmanson et al. | 345/440 |
| 2012/0284155 A1* | 11/2012 | Holten et al. | 705/35 |

OTHER PUBLICATIONS

Corresponding U.S. Appl. No. 13/102,648, filed May 6, 2011 (Not yet published).
Jerding, et al., "The information mural: a technique for displaying and navigating large information spaces", 1995, pp. 43-50.
Jerding, et al., "The information mural: a technique for displaying and navigating large information spaces", IEEE Transactions on Visualization and Computer Graphincs, 1998, pp. 257-271.
Holton, et al., "Trace visualization using hierarchical edge bundles and massive sequence views", Visualizing Software for Understanding and Analysis, 2007, pp. 47-54.
Cornelissen, et al., "Understanding execution traces using massive sequence and circular bundle view", IEEE International Conference on Program Comprehension, 2007, pp. 49-58.

(Continued)

*Primary Examiner* — Xiao Wu
*Assistant Examiner* — Michelle Chin
(74) *Attorney, Agent, or Firm* — Kenealy Vaidya LLP (57) ABSTRACT

Apparatus and methods of generating a display representing a number of interactions occurring over a period of time is disclosed. Data defining a set of interactions is processed to determine an ordering for the interacting elements identified by the data based on calculated distance values for relative positions of pairs of interacting elements corresponding to interactions in the set. The determined ordering can then be used to generate display data where individual interactions are displayed as lines connecting co-ordinates corresponding to the positions in the determined ordering of interacting elements and the time value associated with the interaction. The visual clarity of such a display can be enhanced by selecting the criteria for ordering the elements.

19 Claims, 6 Drawing Sheets

(56) References Cited

OTHER PUBLICATIONS

Cornelissen, B., et al., "Execution trace analysis through massive sequence and circular bundle views," Journal of Systems and Software, Elsevier North Holland, New York, NY, US, vol. 81, No. 12, Mar. 14, 2008.

Mithun, X. L. E., et al., "Linux Package Dependency Visualization," Master's Thesis at Department of Mathematics and Computer Science, Aug. 2009, XP055086086, Eindhoven, The Netherlands, retrieved from the internet: http://alexandria.tue.nl/extral.afstversl/wsk-i/mithun2009.pdf, pp. 1-64.

Jerding, D. F., et al., "The information mural: a technique for displaying and navigating large information spaces," Information Visualization, 1995, Proceedings. Atlanta, GA, USA Oct. 30-31, 1995, Los Alamitos, CA, USA, IEEE Comput. Soc., US, Oct. 30, 1995.

International Search Report and Written Opinion for PCT Patent App. No. PCT/EP2013/067518 (Nov. 11, 2013).

Mar. 5, 2015 International Preliminary Report on Patentability and Written Opinion of the International Searching Authority issued in International Patent Application No. PCT/EP2013/067518.

* cited by examiner

DATA VISUALIZATION SYSTEM

FIELD

The present application concerns a data visualization system.

More specifically embodiments of the present application concern methods and apparatus for visualizing large dynamic graphs to enable patterns, deviations and anomalies to be identified.

BACKGROUND

Networks are present in many fields such as finance, sociology and transportation. Often these networks are dynamic: they have a temporal aspect such as time of transaction, time of connection or time of packet sending. Therefore, visual exploration of these networks plays an important role in understanding network behavior.

Most visualizations separate the structural aspect from the temporal aspect by using either the concept of animation or grouping small multiples of data calls to show the network behavior over time. However, there are obvious problems with animation such as the difficulty to focus on many items simultaneously and the difficulty to track changes over (longer) time periods. Grouping data by multiples (i.e. dividing time into small chunks) is difficult because it is difficult to determine the number of multiples to use; if too many multiples are used detail is too low and the multiples can become too small, if too few multiples are used the detail of change in subsequent multiples is too high and therefore difficult to compare.

In view of the limitations of animation of large data sets, alternative approaches have been suggested. The concept of a massive sequence view for visualizing the timing and interaction of computer object calls was first introduced D. Jerding and J. Stasko in "The information mural: a technique for displaying and navigating large information spaces" Information Visualization", 1995. Proceedings., pages 43-50, October 1995 and expanded upon in "The information mural: a technique for displaying and navigating large information spaces", Visualization and Computer Graphics, IEEE Transactions on, 4(3):257-271, July-September 1998.

The massive sequence view introduced by Jerding et al is an extension of a message sequence chart in which time is mapped to space. In their approach which is used to visualize and analyze program-execution traces each program class c is represented using an (invisible) horizontal line. All lines are positioned equally spaced along the vertical axis. The horizontal axis of the visualization represents chronological order $t_0 \ldots t_n$. If there is a function call from class $c_i$ to class $c_j$ at time $t_k$ a vertical line is drawn with start and endpoints the y-position of $c_i$ and $c_j$ respectively, at horizontal position $t_k$. This is repeated for all function calls in the program execution trace. By examining the message trace, users can discover phases in the execution, relationships between classes, and generally how the objects accomplish the functional purpose of the program. In the system discussed by Jerding et al the classes are shown in the order that they are declared in the header files of the program. Later the classes can be listed vertically according to their alphabetical order; by their appearance order in source files; or by user specification.

As there may be more function calls than there are pixels available for display, Jerding et al have proposed that a massive sequence view should be drawn using anti-aliasing techniques and gray scale shading. Jerding et al also proposed extending the massive sequence view by enabling users to interactively control filtering and abstraction and adding brushing techniques and the use of size and color to highlight individual program calls.

The massive sequence view concept has been refined by Holten et al as disclosed in D. Holten, B. Cornelissen, and J. van Wijk, "Trace visualization using hierarchical edge bundles and massive sequence views", Visualizing Software for Understanding and Analysis, 2007. VISSOFT 2007. 4th IEEE International Workshop, pages 47-54, June 2007 and B. Cornelissen, D. Holten, A. Zaidman, L. Moonen, J. van Wijk, and A. van Deursen, "Understanding execution traces using massive sequence and circular bundle view", Program Comprehension, 2007. ICPC '07. 15th IEEE International Conference on, pages 49-58, June 2007. Holten et al. extend the massive sequence view in such a way that the visibility of outlier calls is guaranteed when visualizing more than hundreds of thousands of calls using Importance-Based Anti-Aliasing and improved zooming capabilities. In the system discussed by Holten et al classes are ordered based upon a user-defined hierarchy to assist with the visualization of data.

Although these developments have assisted in presenting a visualization of data which enables patterns and outliers to be identified further improvements are desired.

SUMMARY

In accordance with one aspect of the present invention there is provided a method of generating a display representing a number of interactions occurring over a period of time, the method comprising: receiving data defining a set of interactions, each of the interactions identifying a first and a second interacting element and a time value; determining an ordering for the interacting elements identified by the received data based on calculated distance values for the distances in the ordering between the relative positions of pairs of interacting elements corresponding to interactions in the set of interactions; and generating a display where individual interactions from the set of interactions are displayed as lines connecting co-ordinates corresponding to the positions in the determined ordering of the first and second interacting elements defining an interaction and the time value associated with the interaction.

In some embodiments determining an ordering for the interacting elements identified by the received data based on calculated distance values for the distances in the ordering between the relative positions of pairs of interacting elements corresponding to interactions in the set of interactions comprises: determining an initial ordering of the interacting elements identified by the received data; and iteratively modifying the initial ordering to minimize a cost function based on calculated distance values for the distances in the ordering between the relative positions of pairs of interacting elements corresponding to interactions in the set of interactions.

In some embodiments the cost function may comprise a cost function corresponding to the total distance values for the distances in the ordering between the relative positions of pairs of interacting elements corresponding to interactions in the set of interactions. In other embodiments the cost function may comprise a cost function corresponding to the standard deviation of distance values for the distances in the ordering between the relative positions of pairs of interacting elements corresponding to interactions in the set of interactions.

In some embodiments an initial ordering of the interacting elements identified by the received data may be determined based upon the number of times an interacting element is identified in the received data. In other embodiments the initial ordering of the interacting elements identified by the received data may be determined based upon the time values associated with interactions. In some such embodiments the initial ordering might be determined by the time value corresponding to the earliest time associated with an interacting element. In other embodiments the initial ordering might be determined based on a determined average time associated with references to particular interaction elements.

Where the determined ordering is based on a minimization of the standard deviation of distance values for the distances in the ordering between the relative positions of pairs of interacting elements corresponding to interactions in the set of interactions a measure of the extent of the apparent visual overlap of blocks of interactions may be determined and the ordering may then be further amended to reduce the amount of visual overlap.

In such embodiments the determined ordering may be determined iteratively by modifying an initial ordering to minimize the standard deviation for the distances in the ordering between relative positions of pairs of interacting elements and then refining the ordering to minimize a measure of extent of apparent visual overlap without increasing the standard deviation by more than a threshold amount. The determination of such an ordering may involve minimizing a cost function measuring an extent of apparent visual overlap where the cost function includes a configurable padding parameter In other embodiments, such processing may be reversed. That is to say rather than determining an ordering based on the minimization of the standard deviation of distance values for the distances in the ordering between the relative positions of pairs of interacting elements and then modifying that ordering to reduce a measure of apparent visual overlap, initially a ordering for minimizing a measure of apparent visual overlap may be calculated and then that ordering may be modified to reduce the standard deviation for the distances in the ordering between relative positions of pairs of interacting elements corresponding to interactions.

Alternatively rather than determining an initial ordering based on the minimization of a first cost function and then modifying the ordering to minimize a second cost function without increasing the first cost function by more than a threshold amount, and ordering which minimized both variations in standard deviation of line length and apparent visual overlap could be determined using a combined cost function. In such a system a user might be able to set a parameter to determine the relative weighting given to minimizing variation in line length and minimizing apparent visual overlap in the cost function being used.

To make blocks of interactions more explicit, color may be used to color interactions between the same interacting elements in the same way. In some embodiments, selecting an interaction may cause all interactions corresponding to the same interacting elements to be colored in the same way.

In some embodiments the display may be a dynamic display which enables a user to switch between one or more orderings of the interacting elements. Suitable ordering may include orderings based on the number of times an interacting element is indicated as interacting; the earliest or average timing associated with interactions involving an interacting element; orderings which minimize the distances between the relative positions of pairs of interacting elements corresponding to interactions in the set of interactions; orderings which minimize the standard deviation of distances between the relative positions of pairs of interacting elements corresponding to interactions in the set of interactions; and orderings which minimize the standard deviation of distances between the relative positions of pairs of interacting elements corresponding to interactions in the set of interactions and the extent of apparent visual overlap between groups of interactions.

In accordance with another aspect of the present invention there is provided a data visualization system comprising: a data store storing data defining a set of interactions, each of the interactions identifying a first and a second interacting element and a time value; a processing unit operable to process data stored in the data store to determine an ordering for the interacting elements identified by the stored data based on calculated distance values for the distances in the ordering between the relative positions of pairs of interacting elements corresponding to interactions in the set of interactions stored in the data store; and a display generation unit operable to generate display data where individual interactions from a set of interactions are displayed as lines connecting co-ordinates corresponding to the positions of the first and second interacting elements defining an interaction in an ordering of interacting elements determined by the processing unit and the time value associated with the interaction.

In accordance with a further aspect of the present invention there is provided a non-transitory computer readable medium storing computer interpretable instructions which when interpreted by a computer cause the computer to: process data defining a set of interactions, each of the interactions identifying a first and a second interacting element and a time value to determine an ordering for the interacting elements identified by the data based on calculated distance values for the distances in the ordering between the relative positions of pairs of interacting elements corresponding to interactions in the set of interactions; and generate display data where individual interactions from the set of interactions are displayed as lines connecting co-ordinates corresponding to the positions in the determined ordering of the first and second interacting elements defining an interaction and the time value associated with the interaction.

BRIEF DESCRIPTION OF THE DRAWINGS

Embodiments of the present invention will now be described in detail with reference to the accompanying drawings in which.

DETAILED DESCRIPTION

Figure 1:
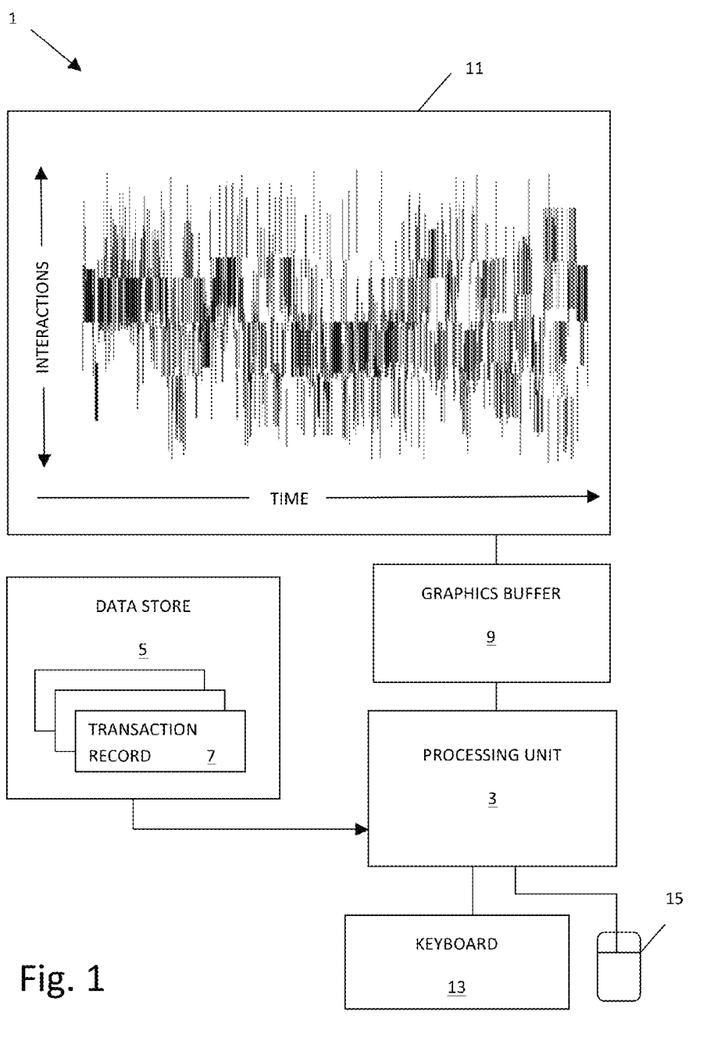
FIG. 1 is a schematic block diagram of a data visualization system accordance with an embodiment of the present invention.

Referring to FIG. 1 which is a schematic block diagram of a data visualization system 1 in accordance with an embodiment of the present invention. In this embodiment the data visualization system 1 comprises a data store 5 arranged to store transaction records 7 each identifying a first and a second interacting element and time data for a transaction and a processing unit 3 arranged to retrieve data from data store 5 and generate a graphic representation representing the transactions as a series of lines on a graph where the lines are presented in time order and the end points of the lines indicate the interacting elements indentified by the transactions. This generated display data is then passed by the processing unit 3 to a graphics buffer 9 connected to the processing unit 3 and a display 11 and is then used by the display 11 to represent the data in the transaction records being analyzed. In addition the processing module 3 is also responsive to user input via a keyboard 13 and a mouse 15 to enable a user to interact with the display and select groups of transactions for processing.

In order to assist a user to identify particular groups or types of interactions, in accordance with the present application when generating display data, the processing unit 3 determines an ordering of the interacting elements which assists in the identification of such groups or types based on the length of lines used to represent the interactions on the display. As will be explained in detail, by selecting the ordering appropriately particular aspects of the transactions stand out so that they are easy to identify.

For example where the ordering of the interacting elements on an axis is such to minimize the total length of lines appearing in a display, this causes frequently occurring transactions or interactions to be shown using shorter lines and less frequent interactions to be shown by longer lines enabling such occurrences to be more easily identified. If the ordering of interacting elements on an axis is such to minimize the variation in length of lines used in a display, such as is illustrated in the display of FIG. 1, this reduces visual clutter and causes lines to be perceived as blocks of similar transactions. The generation of such displays enabling transactions to be visually grouped can be enhanced by causing transactions sharing the same interacting elements to be displayed in the same color and by selecting the ordering so that the length of lines displayed are generally the same and the extent of apparent overlap of lines corresponding to transactions involving different interacting elements is minimized.

Figure 2:
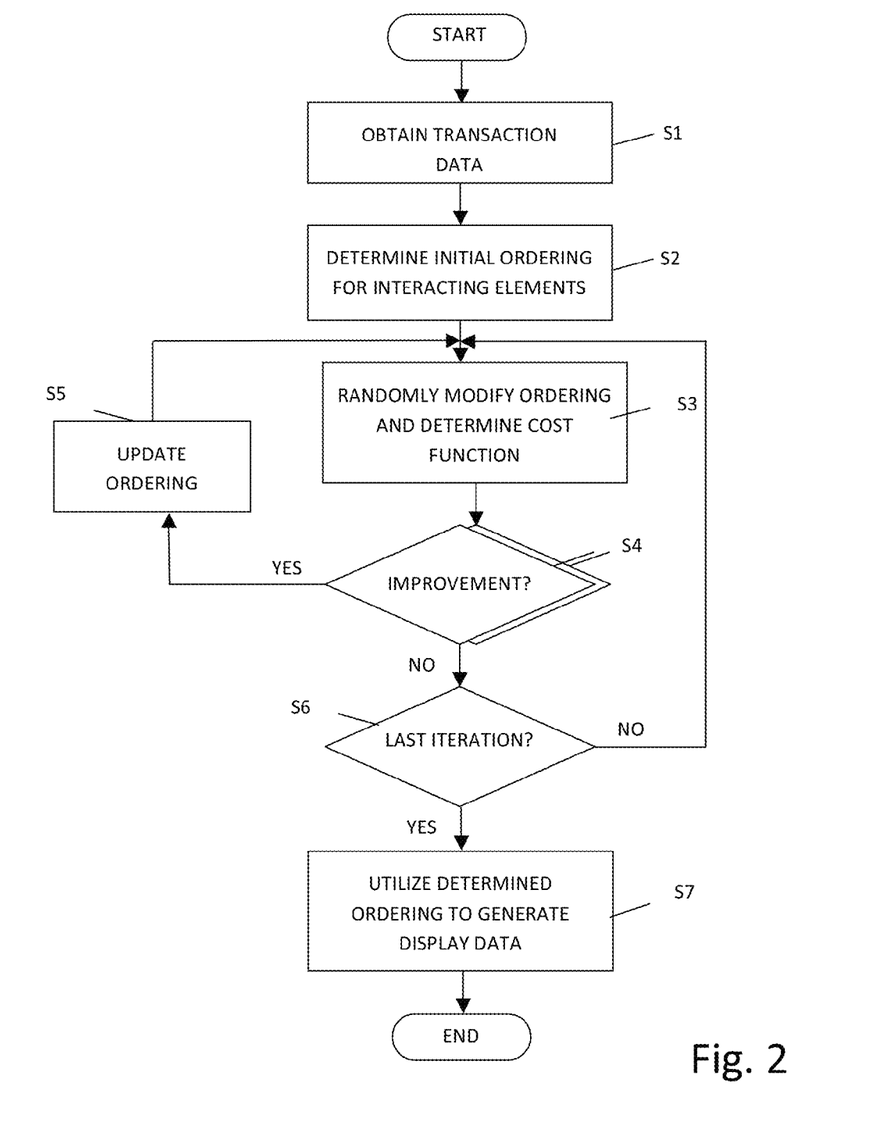
FIG. 2 is a flow diagram of the processing of the data visualization system of FIG. 1.

Turning to FIG. 2 which is a flow diagram of the processing of the data visualization system 1 of FIG. 1, the generation of display data based on a determined ordering of interacting elements will now be explained in greater detail.

As an initial step (s1), the processing unit 3 accesses the set of transaction records 7 stored in the data store 5 which are to be represented in the generated display. The content of the transaction records 7 will depend upon the nature of the data being analyzed and represented. For the purposes of the present application it is sufficient that the transaction records 7 identify a pair of interacting elements and time data which indicates that a particular pair of elements interacted at the time identified by the time data. Additional data may also be included in the transaction records 7. Where the data included in a transaction record 7 contains multiple items of data which is suitable for use as identifying an interacting element, the data fields of the transaction record 7 which are used for generating a display may be selected based on user input via the keyboard 13 and mouse 15.

Having obtained a set of transaction records 7 to be used to generate a display, the processing unit 3 then (s2) proceeds to determine an initial ordering for the interacting elements in the transaction records 7 which are to be utilized to generate a display.

When determining an initial ordering any suitable ordering could be used. One approach would be to use the ordering in which particular elements appear in the data retrieved from the data store 5. Where data is text data, the selected interacting elements could be ordered in alphabetical order.

In some embodiments it may be preferable to select the initial ordering on the basis of certain features of the data contained in the transaction records being processed.

Thus for example, in the initial ordering the interacting elements could be ordered based on the number of times a particular interacting element is identified in the transaction records 7 in the data store 5. Such an ordering would cause those interacting elements which interact frequently to be placed at one end of the ordering and interacting elements which are infrequently identified by the transaction records 7 to be placed at the other end of the ordering.

An alternative approach would be to utilize the time data of the transaction to calculate an initial ordering for the interacting elements. One approach would be to order the elements on the basis of the earliest identified time associated with each interacting element. Alternatively the average time data associated with particular interacting elements could be determined and utilized to order the elements. An advantage of such an ordering would be that interacting elements active early on in the time span would be positioned in one part of the initial ordering, elements active throughout the time span would be positioned in the middle of the ordering and elements mostly active at the end of the time span would be positioned towards the end of the ordering.

Having determined an initial ordering, the processing unit 3 then (s3-s6) proceeds to modify the ordering based on the relative positions of the pairs of interacting elements in individual transaction records 7 in the ordering.

As will be described the relative positions of interacting elements in an ordering utilized to generate a display where those positions identify start and end points for a line representing a transaction determines the length of line utilized to represent that transaction.

The applicants have appreciated that when viewing representations of transactions, there is a tendency for users to implicitly link the length of a line representing a transaction with importance. This is because the length of a line influences the visual attention given to them and longer lines receive visually more attention compared to shorter lines.

This appreciation provides a means for utilizing the ordering to interactions to highlight or emphasize particular aspects of the transaction set being analyzed. Thus for example where less frequent interactions are of interest longer line lengths should be assigned to such transactions. This is because minimizing total line length requires lines corresponding to typical behavior to be given shorter lengths due to their relatively frequent appearance. Therefore such a reordering strategy causes outlier transactions to be represented using longer lines and hence emphasized.

In cases where it is desirable to be able to identify repetition of particular transactions to reduce visual clutter and improve the readability of the visualization it is desirable as far as possible that transactions are represented by lines of the same or similar lengths. Such an ordering would be one which minimized the standard deviation of line lengths.

Determining an ordering of interacting elements which minimizes a parameter such as total line length or the standard deviation of line length is an NP-hard combinatorial optimization problem. However, a good heuristic to approximate such an ordering can be achieved using simulated annealing based on an appropriate cost function and such an approach is adopted in the present embodiment.

Thus in accordance with this embodiment a cost function for the present ordering of interacting elements is determined. In the case of an embodiment determining an ordering to minimize total line length, a suitable cost function would be:

$$\sum_{Transactions} |a_i - b_i|$$

where $a_i$ and $b_i$ are the positions in the current ordering of the interacting elements of the interacting elements of the ith transaction being represented of the set of transactions being processed.

Having determined a cost function value for the current ordering of the interactive elements, the processing unit 3 then (s3) makes a random modification to the current ordering by swapping the positions in the ordering of two randomly selected interacting elements and the cost function value for the modified ordering is then determined. The processing unit 3 then (s4) compares the cost function for the modified ordering with the lowest cost function for any ordering to date.

If this the cost function for the new ordering is not more than a threshold amount greater than the least value for any ordering encountered to date, the new ordering is then (s5) utilized for subsequent processing. Otherwise, the processing unit 3 checks (s6) whether the required number of iterations has occurred and if this is not the case the current ordering is used for subsequent processing. In either case, either if the new ordering has been adopted or if the current ordering is being reused, the processing unit 3 once again determines (s3) a new random modification of the ordering and checks (s5) whether this ordering is an improvement on the previous ordering.

In this way by gradually reducing the threshold for identifying improvements, the processing unit 3 randomly modifies the ordering at each iteration until the final iteration is reached. By rejecting modifications which are more than a threshold amount above a minimum value at each iteration, the selected modifications are such to reduce the cost function and this combined with repeated iteration causes the ordering to become optimized so as to minimize the selected cost function.

When the required number of iterations has been completed (s6), the ordering is then (s7) utilized to generate display data. That is to say for each interaction which is to be displayed, a line is drawn on the display where the line is drawn between co-ordinates identifying the positions of the interacting elements in a transaction in the ordering being utilized and the time data associated with that interaction.

Where the numbers of interactions which are to be displayed exceeds the display capacity, either only a subset of the interaction might be displayed, for example a range of transactions for a particular period of time or alternatively, overwriting and anti-aliasing techniques might be used to represent multiple lines in the same area of the screen.

FIGS. 3-8 are illustrations of displays for a set of transactions illustrating the manner in which a calculated ordering of interacting elements has an effect on the clarity and legibility of a display and how the ordering can be utilized to help emphasize particular aspects of a displayed data set.

Figure 3:
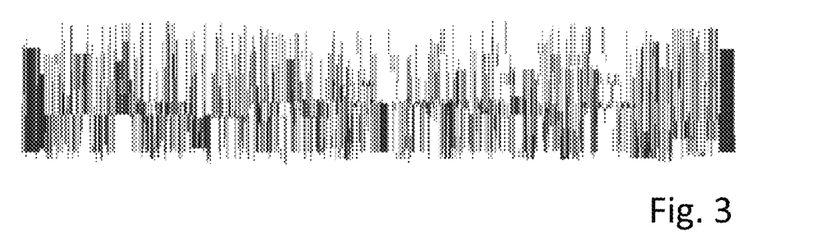
FIG. 3 is an illustration of a series of transactions between pairs of interacting elements represented as lines based on a random ordering of the interacting elements.

Turning to the individual figures, FIG. 3 is an illustration of a display of a typical data set where no processing has been utilized to select a particular ordering of the interacting elements. As can be seen from the figure although such a display enables individual transactions and the timing of the transactions to be displayed visually, from the display is not immediately apparent, for example which interacting elements interact most frequently or whether there are any trends in the manner of interaction over time.

Figure 4:
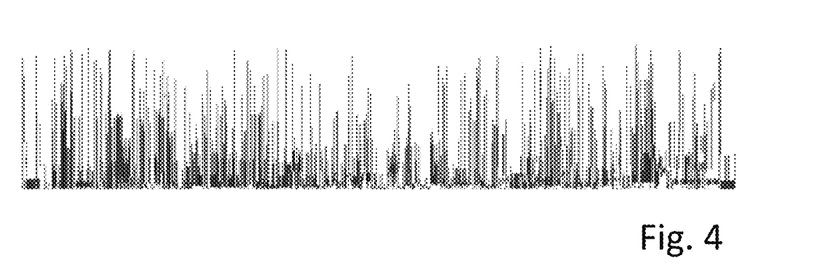
FIG. 4 is an illustration of a series of transactions between pairs of interacting elements represented as lines based on an ordering of the interacting elements based on frequency of interaction.

One way to order interaction elements is to order the elements based on the number of times they appear in the data set. FIG. 4 is an example of such an ordering with the ordering utilized to represent transactions is such that less frequent interacting elements appear at the top of the ordering and interacting elements which appear more frequently appear at the bottom of the illustration. As can be seen from the illustration, representing such transactions as lines based on such an ordering is such to cause those interactions involving interactions between frequently mentioned interacting elements and less frequently mentioned interacting elements to be represented as long lines and hence visually emphasized.

Figure 5:
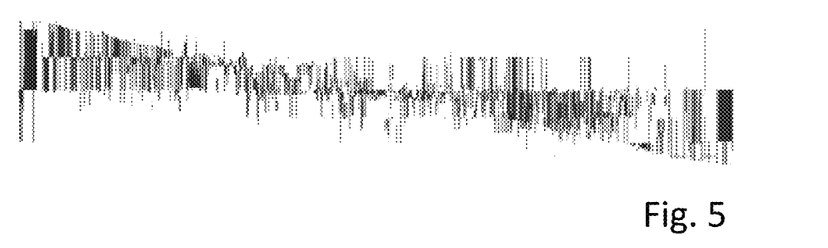
FIG. 5 is an illustration of a series of transactions between pairs of interacting elements represented as lines based on an ordering of the interacting elements based on the average time data associated with the interacting elements.

An alternative ordering which emphasizes the temporal ordering of the interactions is illustrated in FIG. 5. In FIG. 5 this is achieved by taking the weighted time data associated with a particular interacting element. The position of the interacting element pos(V) is then computed by:

$$pos(v) = \left(\frac{1}{|E_v|} \sum_{\forall e \in E_v} N(e)\right) |V|$$

with $E_v$ the set of transaction records which identify interacting element v:

$$\bigcup_{\forall (V_a, V_b, t) \in E} (v_a, v_b, t) : (v_a = v \vee v_b = v)$$

and

N(e) is a normalized time stamp $t \in \{0 \ldots 1\}$ of transaction e.

This configuration reveals at what point in time or period particular interacting elements are most active. The interacting elements that are most active early in the time span $t_0 \ldots t_n$ are positioned at the top of the ordering, the vertices that are most active at the end of the time span are positioned at the bottom and vertices active throughout the entire time span are positioned in the centre. This then provides a user with a representation which is easy to interpret with a natural visual flow of time that is rendered from top left to bottom right.

Figure 6:
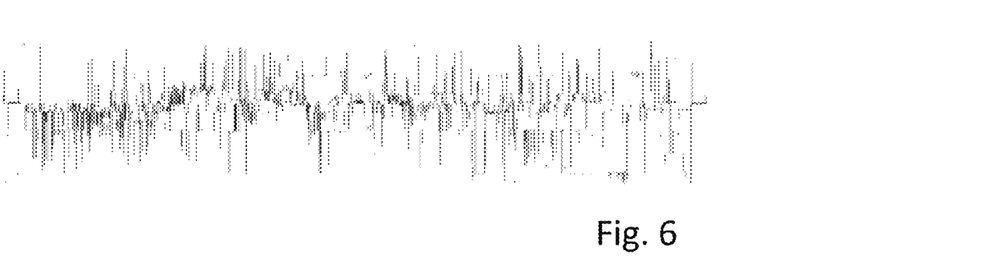
FIG. 6 is an illustration of a series of transactions between pairs of interacting elements represented as lines based on an ordering of the interacting elements minimizing the total line length in the representation.

FIG. 6 illustrates an ordering based on total line length such as is described in detail in the embodiment discussed above. By minimizing total line length, lines corresponding to typical behavior are given shorter lengths due to their relative high appearance frequency. Therefore this reordering strategy reveals outlier interactions in the transaction set because these are represented by the longer lines.

Figure 7:
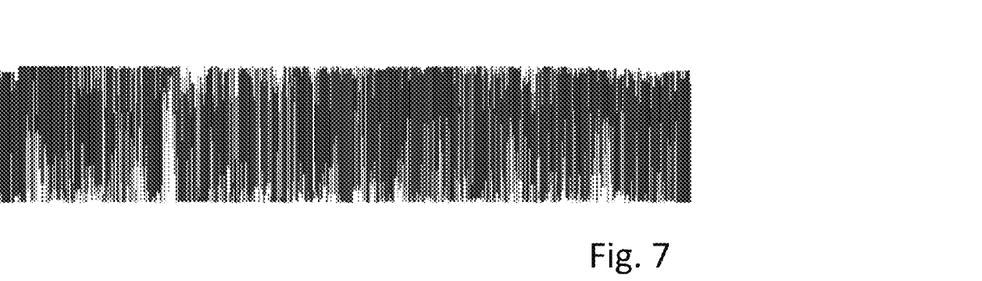
FIG. 7 is an illustration of a series of transactions between pairs of interacting elements represented as lines based on an ordering of the interacting elements maximizing the total line length in the representation.

The representation of FIG. 6 can be contrasted with that of FIG. 7 which is an alternative reordering of the interacting elements which maximizes rather than minimizes total line length. In such a representation as the most frequent occurrences are emphasized the visual clutter of the representation is increased and hence extracting information from the image is made very difficult.

Figure 8:
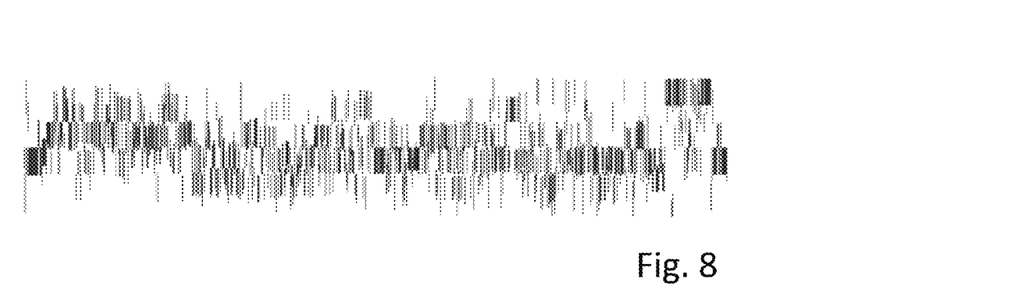
FIG. 8 is an illustration of a series of transactions between pairs of interacting elements represented as lines based on an ordering of the interacting elements minimizing the standard deviation of line length in the representation.

Based on an appreciation of the effect a selected ordering has on a representation and in particular the visual attention which is paid to longer edges, if a balanced view of a set of transactions is desired, it is preferable for the ordering to be such that lines representing transactions should have approximately the same lengths. This can be achieved by using the standard deviation of line lengths to be used as the cost function for the simulated annealing procedure described above with the cost function being set to:

$$\sqrt{\frac{1}{|E|-1} \sum (l(e) - \bar{l})^2}$$

with $$\bar{l} = \frac{1}{|E|} \sum_{\forall e \in E} l(e)$$

where E is the set of transactions and l(e) is the length of line representing transaction e (i.e. the difference in position in the current ordering between the interacting elements of that transaction.

As is apparent from FIG. 8 which is an illustration of a representation of transactions based on an ordering of interacting elements which seeks to minimize the standard deviation of lines representing transactions, such a representation reduces visual clutter and hence improves overall readability of the visualization by reducing cognitive load. Furthermore the minimization of the standard deviation of line lengths reduces unwanted visual attention being addressed to longer lines. Although this improves the clarity of the representation compared with for example that of FIG. 3, it is still the case that in a representation which merely seeks to minimize variation of line length does not take into account the temporal aspects of the data being displayed and particularly the extent to which transactions appear as overlapping blocks which tend to be perceived visually as being linked.

The readability of a representation such as that in FIG. 8 can be further enhanced by reducing the extent of overlap of unrelated blocks of transactions and thereby make blocks stand out from noise.

In order to do so it is necessary to determine some kind of measurement of visual overlap. One approach to estimating apparent visual overlap will now be explained with reference to FIGS. 9A and 9B.

Figure 9A:
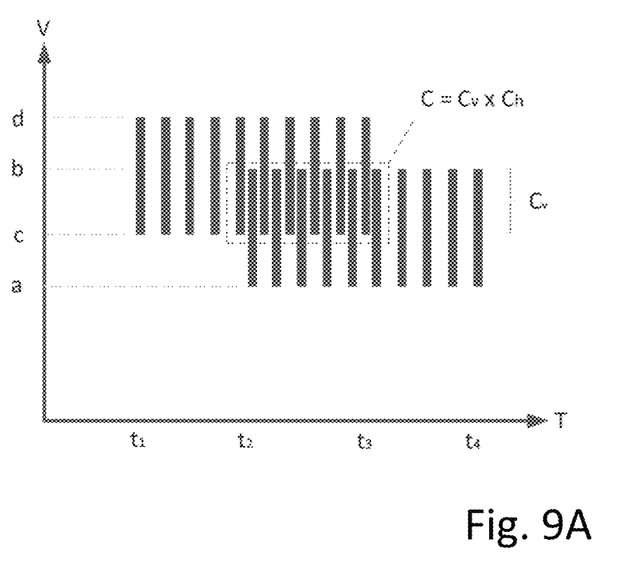
FIGS. 9A and B are a pair of illustrations for explaining a measurement of visual overlap between overlapping blocks of lines.

FIG. 9A is an illustration of a visualization of two bursts of transactions, one a set of interactions between interacting elements c and d which occur between times $t_1$ and $t_3$ and a second burst of transactions, this time between interacting elements a and b which occur between times $t_2$ and $t_4$.

Figure 9B:
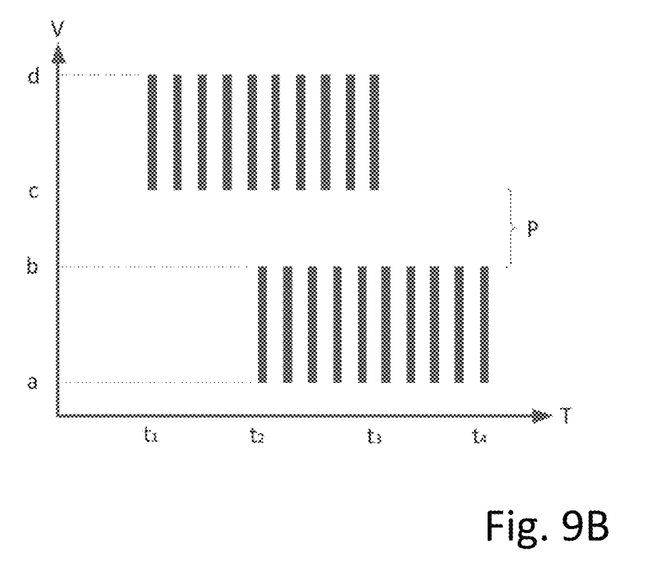

If the co-ordinates associated with interacting elements are modified and re-ordered the visual overlap between the two sets of transactions can be removed. An exemplary illustration of a visualization with the overlap removed is shown in FIG. 9B. In FIG. 9B the interacting elements have been re-ordered to be in alphabetical order and where interactions occur in the same time period which in the present case occurs between the times $t_2$ and $t_3$. The lines corresponding to the transactions have been separated vertically by a padding distance p.

From the illustration in FIG. 9A it is apparent that the visual overlap between the two blocks is proportional to both the extent of horizontal and vertical overlap and the case of FIG. 9A this can be approximated by $(b-c)\times(t_3-t_2)$.

The extent of overlap between blocks of transactions can be generalized to:

$$C(a,b,c,d) = C_v(a,b,c,d) \times C_h(a,b,c,d)$$

where $C_v(a,b,c,d)$ and $C_h(a,b,c,d)$ are measures based on the co-ordinates of the extent of overlap in the vertical and horizontal directions respectively.

In the representations, strictly no overlap occurs as each line is a distinct element associated with discrete positions on the time axis. However, due to their proximity to one another visually an overlap occurs.

To account for this a measure of horizontal overlap can be set based on a density profile using a Kernel Density Estimation approach so that:

$$C_h(a, b, c, d) = \sum_{t=t_0}^{t_n} f(a, b, t) f(c, d, t)$$

where $f(a,b,t)$ is a density profile $$f(a, b, t) = \sum_{\forall e \in E(a,b)} h(t - e_t)$$

with h(t) a kernel such as a Gaussian for example: gauss $$\sigma(x) = \frac{1}{\sqrt{2\pi}} e^{\frac{x^2}{2\sigma^2}}$$

The value selected for σ will then define what is considered a block. If the edges of a block in data are sparse a large σ should be used to consider the edges as blocks. If blocks in the data are dense then a small σ is appropriate. The kernel size and the σ should be set by a user based on domain knowledge. If, for example, the data is known to contain sparse blocks or there is interest in identifying sparse blocks then a large a should be used.

A simple measure of the extent of vertical overlap can be determined directly from the co-ordinates representing the transactions with for example $$C_v(a,b,c,d) = \max(\min(b,d) - \max(a,c), 0)$$

However such an approach does not generate padding between blocks of interactions so a preferable measure of vertical overlap is $$C_v(a, b, c, d) = \max\left(\left(\min(b, d) + \frac{p}{2}\right) - \left(\max(a, c) - \frac{p}{2}\right), 0\right)$$

where p is a user configurable padding parameter.

A measure of visual overlap for a particular ordering of the interacting elements can then be determined as:

$$\sum_{\forall (i,k,j,l) \in V} C_v(i, j, k, l) \times C_h(i, j, k, l)$$

where the indices i,j,k,l are chosen such that |F(i, j)|>N and |F(k, l)|>N to discard sparse sets, which are in general not of interest. Furthermore, it must hold that i≠j and k≠l to discard self loops and finally, ¬((i=k)^(j=l)) to prevent taking self overlap into account. Note that $C_h$ can be computed and stored independently from the current configuration to speed up the final coverage computation by using a look up table.

One approach to determining an ordering which seeks to minimize variation in line length whilst minimizing visual overlap is to process the data in a two step process.

In such a process, initially an ordering determined in the manner which has been described above utilizing simulated annealing to minimize a cost function corresponding to the standard deviation of line length used to represent a set of transactions is determined. Having determined such an ordering the ordering is then modified to minimize the calculated visual overlap criteria again using simulated annealing, aiming to minimize a visual overlap cost parameter subject to a restriction that the re-ordering does not increase the variation in line length by more than a threshold amount compared with the variation determined prior to reordering to account for visual overlap.

Figure 10:
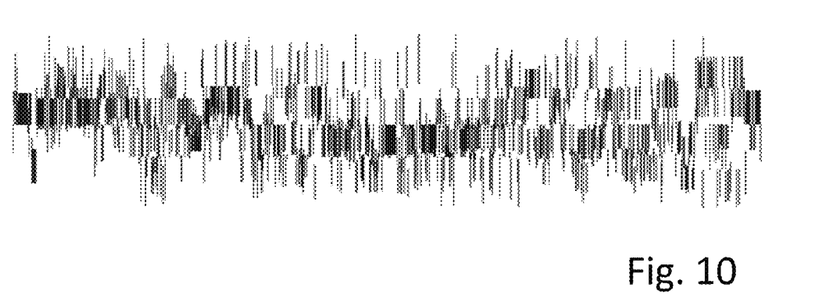
FIG. 10 is an illustration of a series of transactions between pairs of interacting elements represented as lines based on an ordering of the interacting elements after modifying an ordering minimizing the standard deviation of line length in the representation to reduce the amount of overlap between blocks of overlapping lines.

FIG. 10 is an illustration of a representation based on a ordering which both minimizes line length variation and seeks to reduce visual overlap. As can be seem in FIG. 10, selecting the ordering of transaction elements in this way causes blocks of similar transactions to be more readily visually apparent. Seeking to minimize variation in line length means that most transactions are represented by lines of approximately the same length and hence no particular transactions are emphasized. The deliberate re-ordering to reduce visual overlap then reduces the erroneous perception of unrelated transactions as forming blocks solely due to apparent visual overlap.

The identification of related blocks of transactions can be further enhanced through the use of color. More specifically all lines of a particular length can be rendered using the same color. Since all transactions between the same interacting elements will be rendered using lines of the same length, this will result in blocks of transactions between the same elements to be rendered in the same color and hence emphasize the appearance of the interactions as being related.

It will be appreciated that as different orderings emphasize different aspects of a data set, it can be preferable to provide a dynamic display system which enables a user to switch between different orderings. Thus for example having calculated an ordering which minimizes apparent visual overlap, a user might wish to view the same data displayed based on an ordering which emphasized infrequent transactions or the average timing of specific interactions. In such a display users may also be able to select individual transactions using the keyboard 13 and mouse 15 to cause all similar transactions to be highlighted so that they can be identified in a particular view.

More specifically in some embodiments, when a user selects a particular transaction all transactions involving the pair of interacting elements associated with that transaction might be caused to be rendered in a particular color.

In other embodiments rather than utilizing color to highlight specific transactions or blocks of transactions the rendering of color may be used to display other information associated with particular transactions. Thus for example where transactions are associated with multiple attributes, one or more of the attributes might be utilized to determine a color for a display corresponding to particular transactions.

In the above described embodiments the display of transactions as lines capturing the temporal variation of interacting elements has been described. It will be appreciated that the described manner of generating display information may be combined with other displays to illustrate other aspects of the interaction. Thus for example the described system could be combined with apparatus such as that described in Synerscope's earlier U.S. patent application Ser. No. 13/102,648 which is hereby incorporated by reference.

A system has been described in which initially an ordering is determined which minimizes a cost function for the variation in line length and then proceeds to modify the determined ordering to reduce a function based on a measure of apparent visual overlap. It will be appreciated that similar orderings which cause transactions to be presented by lines of generally consistent length and where overlapping blocks of unrelated transactions are avoided could be generated in other ways.

Thus for example rather than determining an ordering based on the minimization of the standard deviation of distance and then modifying that ordering to reduce a measure of apparent visual overlap, initially a ordering for minimizing a measure of apparent visual overlap could be calculated and then that ordering could then be modified to reduce the standard deviation for the distances in the ordering between relative positions of pairs of interacting elements corresponding to interactions.

Alternatively in other embodiments a costs function combining measures of variation in line length and a measure of apparent visual overlap could be utilized to determine an ordering simultaneously. In such a system a user might be able to set a parameter to determine the relative weighting given to minimizing variation in line length and minimizing apparent visual overlap in the cost function being used.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A method of generating a display representing a number of interactions occurring over a period of time, the method comprising:
 receiving data defining a set of interactions, each of the interactions identifying a first and a second interacting element and a time value;
 determining an initial ordering for the interacting elements identified by the received data;
 iteratively modifying the initial ordering to minimize a cost function indicative of the standard deviation of distance values for the distances in the ordering between the relative positions of pairs of interacting elements corresponding to interactions in the set of interactions and a measurement of visual overlap; and
 generating a display where individual interactions from the set of interactions are displayed as lines connecting co-ordinates corresponding to the positions in the determined ordering of the first and second interacting elements defining an interaction and the time value associated with the interaction.

2. The method of claim 1, wherein the initial ordering of the interacting elements identified by the received data comprises an ordering determined based upon the number of times an interacting element is identified in the received data.

3. The method of claim 1, wherein the initial ordering of the interacting elements identified by the received data comprises an ordering determined based upon the time values associated with interactions.

4. The method of claim 3 wherein the initial ordering of the interacting elements identified by the received data comprises an ordering determined based on the time value corresponding to an earliest time associated with an interacting element.

5. The method of claim 3 wherein the initial ordering of the interacting elements identified by the received data comprises an ordering determined based on the time value corresponding to an average time associated with references to particular interaction elements.

6. The method of claim 1, wherein iteratively modifying the initial ordering to minimize a cost function indicative of the standard deviation of distance values for the distances in the ordering between the relative positions of pairs of interacting elements corresponding to interactions in the set of interactions and a measurement of visual overlap comprises:
 iteratively modifying the initial ordering to minimize a cost function based on calculated distance values for the distances in the ordering between the relative positions of pairs of interacting elements corresponding to interactions in the set of interactions; and
 further modifying the determined ordering to reduce an extent of visual overlap between blocks of interactions.

7. The method of claim 6 wherein modifying the determined ordering to reduce an extent of visual overlap between blocks of interactions comprises:
 determining a measurement of the extent of visual overlap between blocks of interactions for a determined ordering; and
 iteratively modifying said determined ordering to reduce measurement of the extent of visual overlap without increasing the standard deviation by more than a threshold amount.

8. The method of claim 6 wherein modifying the determined ordering to reduce an extent of visual overlap between blocks of interactions comprises determining an ordering to minimize a cost function measuring an extent of overlap where the cost function includes a configurable padding parameter.

9. The method of claim 1 wherein the initial ordering of the interacting elements identified by the received data comprises an ordering determined based upon the minimization of a cost function measuring an extent of visual overlap; and iteratively modifying the initial ordering comprises iteratively modifying the initial ordering to minimize a cost function corresponding to the standard deviation of distance values for the distances in the ordering between the relative positions of pairs of interacting elements corresponding to interactions in the set of interactions.

10. The method of claim 9 wherein iteratively modifying the initial ordering to minimize a cost function corresponding to the standard deviation of distance values for the distances in the ordering between the relative positions of pairs of interacting elements corresponding to interactions in the set of interactions comprises:
 iteratively modifying the initial ordering to minimize a cost function corresponding to the standard deviation of distance values for the distances in the ordering between the relative positions of pairs of interacting elements corresponding to interactions in the set of interactions without increasing a measurement of visual overlap by more than a threshold amount.

11. The method of claim 1 wherein generating the display where individual interactions from the set of interactions are displayed as lines connecting co-ordinates corresponding to the positions in the determined ordering of the first and second interacting elements defining an interaction and the time value associated with the interaction comprising generating a display where representations of interactions involving the same interacting elements are represented using the same color.

12. The method of claim 1, further comprising: responding to user selection of a representation of an interaction in the generated display by causing the representations of interactions identifying the same interaction elements as the selected element to be displayed in the same color.

13. The method of claim 1, further comprising: responding to user identification of an ordering by generating a display where individual interactions from the set of interactions are displayed as lines connecting co-ordinates corresponding to the positions of the first and second interacting elements defining an interaction in the ordering and the time value associated with the interaction.

14. The method of claim 1 wherein the initial orderings of interacting elements comprises orderings based on any of:
 the number of times an interacting element is indicated as interacting;
 the earliest or average timing associated with interactions involving an interacting element;
 orderings which minimize the distances between the relative positions of pairs of interacting elements corresponding to interactions in the set of interactions;
 orderings which minimize the standard deviation of distances between the relative positions of pairs of interacting elements corresponding to interactions in the set of interactions; and
 orderings which minimize the standard deviation of distances between the relative positions of pairs of interacting elements corresponding to interactions in the set of interactions and the extent of visual overlap between groups of interactions.

15. A method of generating a display representing a number of interactions occurring over a period of time, the method comprising:

receiving data defining a set of interactions, each of the interactions identifying a first and a second interacting element and a time value;

determining an initial ordering for the interacting elements identified by the received data;

iteratively modifying the initial ordering to minimize a cost function wherein the cost function comprises a weighted sum of a first cost function indicative of the standard deviation of distance values for the distances in the ordering between the relative positions of pairs of interacting elements corresponding to interactions in the set of interactions and a second cost function indicative of a measurement of visual overlap wherein the relative weightings assigned to the first and second cost functions are set in response to user input; and generating a display where individual interactions from the set of interactions are displayed as lines connecting co-ordinates corresponding to the positions in the determined ordering of the first and second interacting elements defining an interaction and the time value associated with the interaction.

16. A data visualization system comprising:

a data store storing data defining a set of interactions, each of the interactions identifying a first and a second interacting element and a time value;

a processing unit operable to process data stored in the data store to determine an ordering for the interacting elements identified by the stored data based on calculated distance values for the distances in the ordering between the relative positions of pairs of interacting elements corresponding to interactions in the set of interactions stored in the data store; and a display generation unit operable to generate display data where individual interactions from a set of interactions are displayed as lines connecting co-ordinates corresponding to the positions of the first and second interacting elements defining an interaction in an ordering of interacting elements determined by the processing unit and the time value associated with the interaction wherein the processing unit determines the ordering for the interacting elements by:

determining an initial ordering of the interacting elements identified by the stored data; and iteratively modifying the initial ordering to minimize a cost function based on calculated distance values for the distances in the ordering between the relative positions of pairs of interacting elements corresponding to interactions in the set of interactions, the operation of iteratively modifying the initial ordering includes iteratively modifying the initial ordering to minimize a cost function indicative of the standard deviation of distance values for the distances in the ordering between the relative positions of pairs of interacting elements corresponding to interactions in the set of interactions and a measurement of visual overlap.

17. A non-transitory computer readable medium storing computer interpretable instructions which when interpreted by a computer cause the computer to:

process data defining a set of interactions, each of the interactions identifying a first and a second interacting element and a time value to determine an ordering for the interacting elements identified by the data based on calculated distance values for the distances in the ordering between the relative positions of pairs of interacting elements corresponding to interactions in the set of interactions; and generate display data where individual interactions from the set of interactions are displayed as lines connecting co-ordinates corresponding to the positions in the determined ordering of the first and second interacting elements defining an interaction and the time value associated with the interaction wherein the determining of the ordering for the interacting elements includes: determining an initial ordering of the interacting elements identified by the data; and iteratively modifying the initial ordering to minimize a cost function based on calculated distance values for the distances in the ordering between the relative positions of pairs of interacting elements corresponding to interactions in the set of interactions, the cost function including a weighted sum of a first cost function indicative of the standard deviation of distance values for the distances in the ordering between the relative positions of pairs of interacting elements corresponding to interactions in the set of interactions and a second cost function indicative of a measurement of visual overlap, such that the relative weightings assigned to the first and second cost functions are set in response to user input.

18. A data visualization system comprising:

a data store storing data defining a set of interactions, each of the interactions identifying a first and a second interacting element and a time value;

a processing unit operable to process data stored in the data store to determine an ordering for the interacting elements identified by the stored data based on calculated distance values for the distances in the ordering between the relative positions of pairs of interacting elements corresponding to interactions in the set of interactions stored in the data store; and a display generation unit operable to generate display data where individual interactions from a set of interactions are displayed as lines connecting co-ordinates corresponding to the positions of the first and second interacting elements defining an interaction in an ordering of interacting elements determined by the processing unit and the time value associated with the interactions, wherein the processing unit determines the ordering for the interacting elements by: determining an initial ordering of the interacting elements identified by the stored data; and iteratively modifying the initial ordering to minimize a cost function based on calculated distance values for the distances in the ordering between the relative positions of pairs of interacting elements corresponding to interactions in the set of interactions, the cost function including a weighted sum of a first cost function indicative of the standard deviation of distance values for the distances in the ordering between the relative positions of pairs of interacting elements corresponding to interactions in the set of interactions and a second cost function indicative of a measurement of visual overlap, such that the relative weightings assigned to the first and second cost functions are set in response to user input.

19. A non-transitory computer readable medium storing computer interpretable instructions which when interpreted by a computer cause the computer to:

process data defining a set of interactions, each of the interactions identifying a first and a second interacting element and a time value to determine an ordering for the interacting elements identified by the data based on calculated distance values for the distances in the ordering between the relative positions of pairs of interacting elements corresponding to interactions in the set of interactions; and generate display data where individual interactions from the set of interactions are displayed as lines connecting co-ordinates corresponding to the positions in the determined ordering of the first and second interacting elements defining an interaction and the time value associated with the interaction, wherein the determining of the ordering for the interacting elements includes: determining an initial ordering of the interacting elements identified by the data; and iteratively modifying the initial ordering to minimize a cost function based on calculated distance values for the distances in the ordering between the relative positions of pairs of interacting elements corresponding to interactions in the set of interactions, the operation of iteratively modifying the initial ordering includes iteratively modifying the initial ordering to minimize a cost function indicative of the standard deviation of distance values for the distances in the ordering between the relative positions of pairs of interacting elements corresponding to interactions in the set of interactions and a measurement of visual overlap.

* * * * *